US010821908B2

(12) United States Patent
Blowers et al.

(10) Patent No.: US 10,821,908 B2
(45) Date of Patent: Nov. 3, 2020

(54) COMPUTER CRADLE

(71) Applicant: PANASONIC MANUFACTURING UK LIMITED, Cardiff (GB)

(72) Inventors: Robert Blowers, Cardiff (GB); Shaun Lawlor, Cardiff (GB); Darren Mong Hay, Cardiff (GB)

(73) Assignee: Panasonic Manufacturing UK Limited, Cardiff (GB)

(*) Notice: Subject to any disclaimer, the term of this patent is extended or adjusted under 35 U.S.C. 154(b) by 0 days.

(21) Appl. No.: 16/060,519

(22) PCT Filed: Dec. 13, 2016

(86) PCT No.: PCT/GB2016/053925
§ 371 (c)(1),
(2) Date: Jun. 8, 2018

(87) PCT Pub. No.: WO2017/098284
PCT Pub. Date: Jun. 15, 2017

(65) Prior Publication Data
US 2018/0361945 A1 Dec. 20, 2018

(30) Foreign Application Priority Data

Dec. 9, 2015 (GB) .................................. 1521672.4

(51) Int. Cl.
G06F 1/16 (2006.01)
H05K 5/00 (2006.01)
(Continued)

(52) U.S. Cl.
CPC ........ B60R 11/0252 (2013.01); G06F 1/1632 (2013.01); G06F 1/1635 (2013.01); G06F 1/203 (2013.01); B60R 2011/001 (2013.01)

(58) Field of Classification Search
CPC ........... B60R 11/0252; B60R 2011/001; B60R 11/0241; B60R 11/0258; B60R 11/0235;
(Continued)

(56) References Cited

U.S. PATENT DOCUMENTS 5,177,665 A 1/1993 Frank et al.
5,305,217 A 4/1994 Nakamura et al.
(Continued)

FOREIGN PATENT DOCUMENTS

EP 1816539 A2 8/2007
KR 2020120004654 U 6/2012
(Continued)

OTHER PUBLICATIONS

PCT/GB2016/053925 International Search Report and Written Opinion dated Mar. 6, 2017, 9 pages.
Great Britain Search Report, GB1521672.4, dated May 31, 2016.

Primary Examiner — Anthony M Haughton
(74) Attorney, Agent, or Firm — Hahn Loeser & Parks LLP; Daniel J. Smola

(57) ABSTRACT

The present invention concerns a tablet device (10) and an associated cradle (12) holding the tablet device. The cradle comprises a mounting portion (18) for mounting the tablet device (10) and cradle (12) to a steering wheel (60). The mounting portion (18) is configured such that when the tablet device (10) and associated cradle (12) is mounted to a steering wheel (60), a bottom edge of the tablet device (10) and associated cradle (12) lies outside a first airbag-deployment-zone (70) and within a second airbag-deployment-zone (72). Contact between the bottom edge of the tablet device (10) and associated cradle (12) and an airbag deployed into the second airbag-deployment-zone (72) pushes the tablet device (10) and associated cradle (12) into the steering wheel (60).

10 Claims, 4 Drawing Sheets

(51) Int. Cl.
*H05K 7/00* (2006.01)
*B60R 11/02* (2006.01)
*G06F 1/20* (2006.01)
*B60R 11/00* (2006.01)

(58) Field of Classification Search
CPC ............. B60R 11/02; B60R 2011/0001; B60R 2011/0003; G06F 1/1632; G06F 1/1635; G06F 1/203
See application file for complete search history.

(56) References Cited

U.S. PATENT DOCUMENTS

| | | | | |
|---|---|---|---|---|
| 6,127,802 A | * | 10/2000 | Lloyd | ................... H02J 7/0044 320/113 |
| 7,580,255 B2 | * | 8/2009 | Crooijmans | .......... G06F 1/1632 361/679.41 |
| 2007/0029359 A1 | | 2/2007 | Smith | |
| 2007/0152633 A1 | * | 7/2007 | Lee | ........................ G06F 1/1632 320/114 |
| 2007/0285053 A1 | * | 12/2007 | Noguchi | ................... H02J 7/32 320/114 |
| 2011/0101058 A1 | * | 5/2011 | Heckman | ............... B64D 45/00 224/401 |
| 2012/0080465 A1 | * | 4/2012 | Son | ........................ B60R 11/02 224/276 |
| 2013/0053145 A1 | * | 2/2013 | Lin | ........................ A63F 13/98 463/37 |
| 2014/0268544 A1 | * | 9/2014 | Johnson | ............... G06F 1/1632 361/679.44 |
| 2015/0220113 A1 | * | 8/2015 | Zhao | ....................... G06F 1/1626 710/303 |

FOREIGN PATENT DOCUMENTS

| | | |
|---|---|---|
| KR | 1020130049860 A | 5/2013 |
| KR | 200471299 Y1 | 2/2014 |
| TW | 201038425 A | 11/2010 |
| WO | 2015079445 A1 | 6/2015 |

* cited by examiner

COMPUTER CRADLE

FIELD OF THE INVENTION

The present invention concerns a computer cradle. More particularly, but not exclusively, this invention concerns a cradle for a tablet computer. The invention also concerns a cradle for mounting a tablet computer to a steering wheel.

BACKGROUND OF THE INVENTION

Computers, and particularly tablet computers (tablet devices) are increasingly being used during manufacturing processes, for example on car (or other vehicles) assembly lines. The tablet devices may be used to program a vehicle computer during manufacture, and/or run diagnostic tests on a vehicle during manufacture. The tablet devices may also be used to track various stages of the manufacturing process, and/or the use of suitably marked parts used during the manufacturing process. An example of such a tablet device is the Panasonic Toughpad FZ-M1.

In order to use the tablet device in a manufacturing assembly line, it may be necessary to provide the tablet device with a cradle, to enable an operator to place or mount the tablet device in an appropriate location whilst the operator works on the vehicle. Such a location may be the steering wheel of the vehicle being assembled, and/or the dashboard of the vehicle. Steering wheels usually comprise airbags, which may be accidentally deployed during vehicle assembly. If a tablet device is mounted to a steering wheel in an inappropriate location, deployment of the airbag may cause the tablet device to hit an operator working on the vehicle. Present solutions to this problem include mounting the tablet device in a high position on the top of the steering wheel, such that if an airbag is deployed, the tablet device is not contacted by the airbag. An example of such a solution may be seen in U.S. Pat. No. 6,305,217. As can be seen in FIGS. 1 and 6 of U.S. Pat. No. 6,305,217, the tablet device and cradle are located such that if an airbag deploys, no contact is made with the tablet device and cradle, or if contact is made, the tablet device and cradle are pushed upwards, rotating around the top of the steering wheel. However, such an arrangement may provide the tablet device in a position in which the user finds the tablet device difficult to operate. This is particularly true in vehicles with a low roof height, where the cabin of the vehicle may become cramped with such an arrangement.

The present invention seeks to mitigate the above-mentioned problems. Alternatively or additionally, the present invention seeks to provide an improved cradle and tablet device.

SUMMARY OF THE INVENTION

The present invention provides, according to a first aspect, a tablet device and an associated cradle holding the tablet device, wherein the cradle comprises a mounting portion for mounting the tablet device and cradle to a steering wheel, the mounting portion configured such that when the tablet device and associated cradle is mounted to a steering wheel, a bottom edge of the tablet device and associated cradle lies outside a first airbag-deployment-zone and within a second airbag-deployment-zone, such that contact between the bottom edge of the tablet device and associated cradle and an airbag deployed into the second airbag-deployment-zone pushes the tablet device and associated cradle into the steering wheel.

The tablet device may be removably held by the cradle, such that the tablet device may be removed from the cradle, and used independently of the cradle.

The cradle may be referred to as a gadget.

The first airbag-deployment-zone may be the initial airbag-deployment-zone. Such a zone may be the area into which an airbag deploys, in a partially expanded state, immediately after the airbag is triggered. The second airbag-deployment-zone may be the fully deployed airbag-deployment zone. Such a zone may be defined by the fully expanded airbag. Advantageously, the tablet device and associated cradle are located on a steering wheel such that deployment of a steering wheel airbag results in the airbag pushing the tablet device and associated cradle in a direction away from the direction of the initial deployment of the airbag. Preferably, the tablet device and associated cradle is pushed towards an instrument cluster of a vehicle to which the steering wheel belongs. Preferably, the tablet device and associated cradle is pushed into an aperture in the steering wheel to which the tablet device and associated cradle is mounted. The tablet device and cradle may be more conveniently mounted to a steering wheel, such that the tablet device is positioned where an operator may easily operate the tablet device. Such an arrangement is in contrast to the prior art tablet device and cradle arrangements, where the tablet device is mounted high up on a steering wheel, to avoid any obstruction of an airbag deployment zone.

The present invention uses the action of the airbag deploying to move the tablet device and cradle into a safe position, where an operator is not vulnerable to injury, for example due to the tablet device and cradle being projected towards the operator. As the invention exploits the deployment characteristics of an airbag to ensure the safe management of the tablet device and cradle, it is not necessary to mount the tablet device and cradle in a high position on the steering wheel, which may make the tablet device more difficult to use.

The cradle may comprise an active cooling system for cooling the tablet device. Such an active cooling system may comprise a powered fan. The powered fan may be powered by a battery or be connected to an alternative power supply. The cradle may comprise a replaceable and/or rechargeable battery for running a powered fan. The cradle may comprise a removable portion configured to allow access to a battery holding portion of the tablet device.

The cradle may comprise multiple charging connections configured to allow various charging apparatus to charge the tablet device. The cradle may comprise a configuration port arranged to allow the tablet device to be configured whilst remaining engaged with the cradle. The cradle may comprise various connection points to allow additional components, for example barcode readers, to be connected to and interact with the tablet device. The cradle may comprise various connection points to allow the tablet device to be connected to and interact with various standard tablet device accessories. The tablet device may comprise a touchscreen for providing operator input to the tablet device.

The cradle may comprise a replaceable insert. The replaceable insert may be associated with the mounting portion of the cradle. Removal or replacement of the replaceable insert may allow the cradle to be adapted to be mounted to various differently shaped and sized steering wheels. Additionally or alternatively, the replaceable insert may allow the position of the tablet device to be altered in dependence on the location of the first airbag-deployment-zone and second airbag-deployment-zone of the steering wheel to which the tablet device and cradle is mounted.

According to a second aspect of the invention there is also provided a method of mounting a tablet device and associated cradle to a steering wheel, the tablet device and associated cradle as described with reference to the first aspect of the invention, comprising the steps of:

mounting the tablet device and associated cradle to the steering wheel such that a bottom edge of the tablet device and associated cradle is located outside a first airbag-deployment zone and inside a second airbag-deployment zone.

According to a third aspect, the invention provides a cradle, the cradle configured to hold a tablet device, the cradle comprising a mounting portion for mounting to a steering wheel, such that when the cradle is holding a tablet device, a bottom edge of the tablet device and cradle is located outside a first airbag-deployment zone and inside a second airbag-deployment zone.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
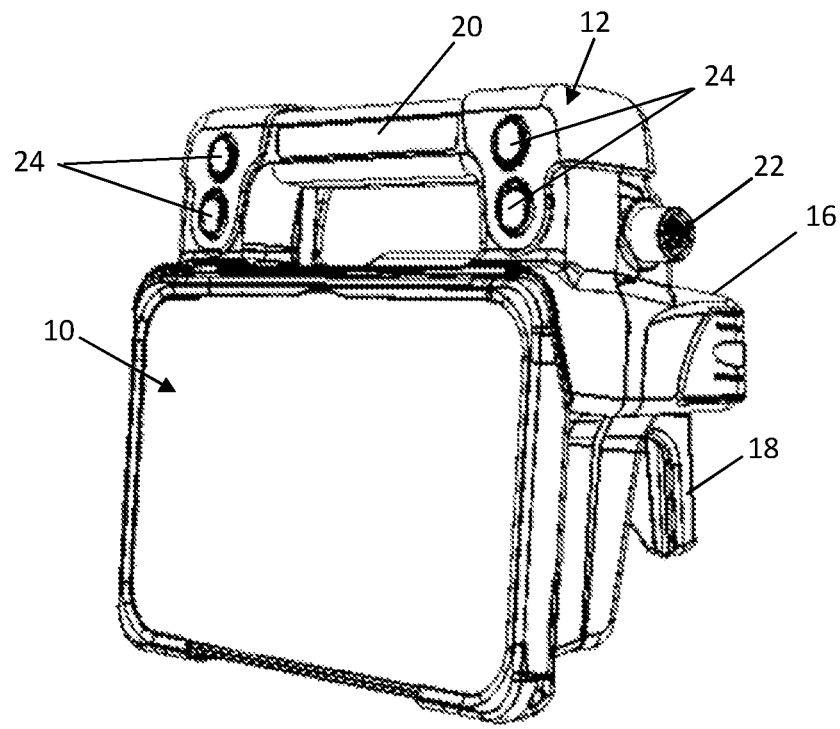
FIG. 1 shows an isometric view of a tablet device and cradle according to a first embodiment of the invention.
Figure 2:
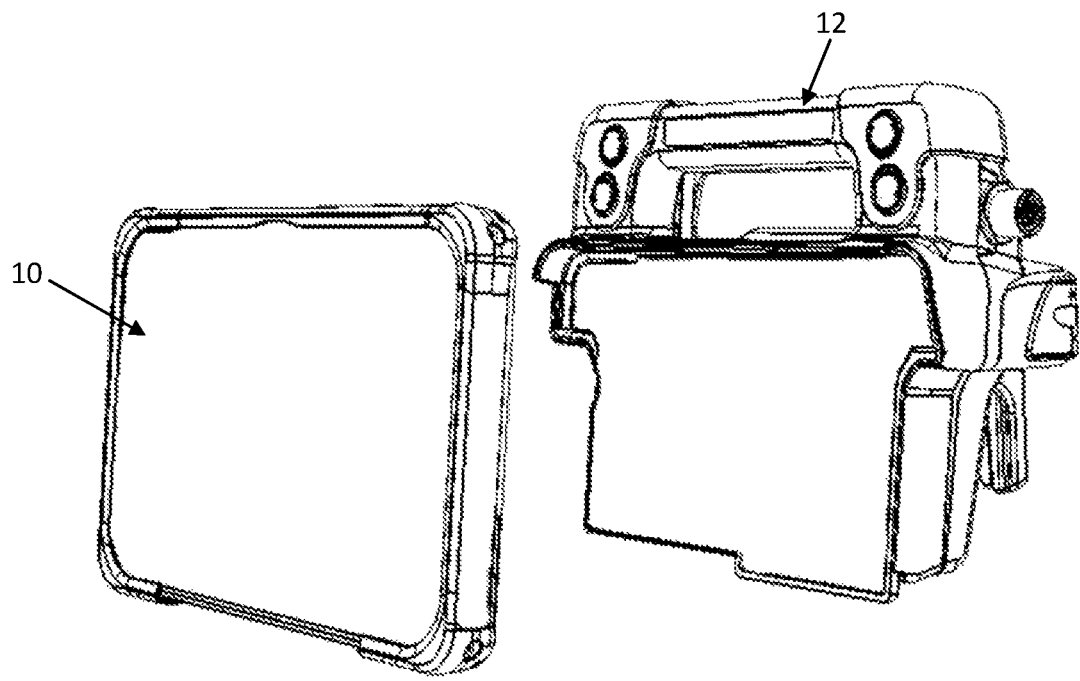
FIG. 2 shows an exploded view of the tablet device and cradle as shown in FIG. 1.
Figure 3:
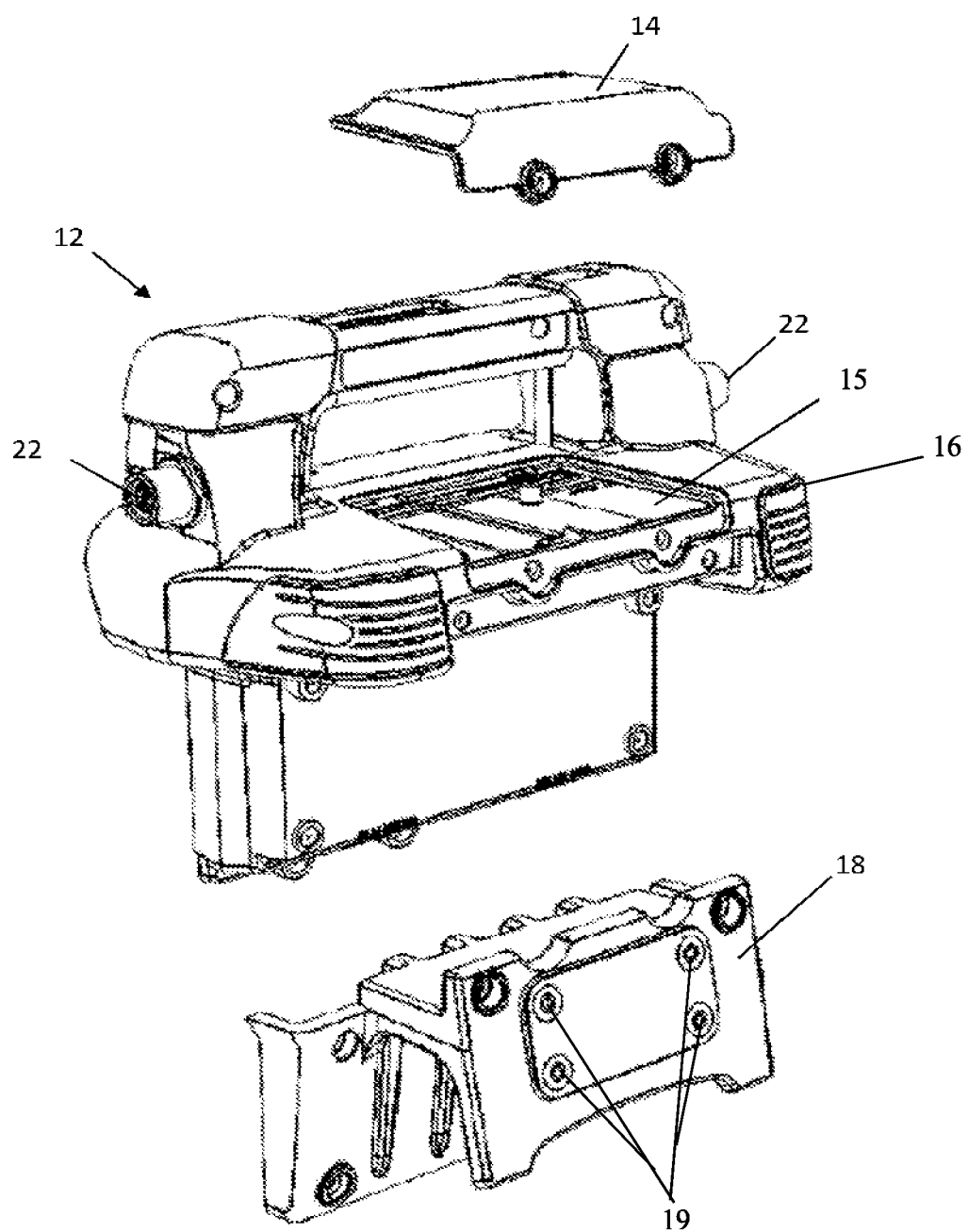
FIG. 3 shows an exploded rear view of the tablet device shown in FIG. 1.
Figure 4:
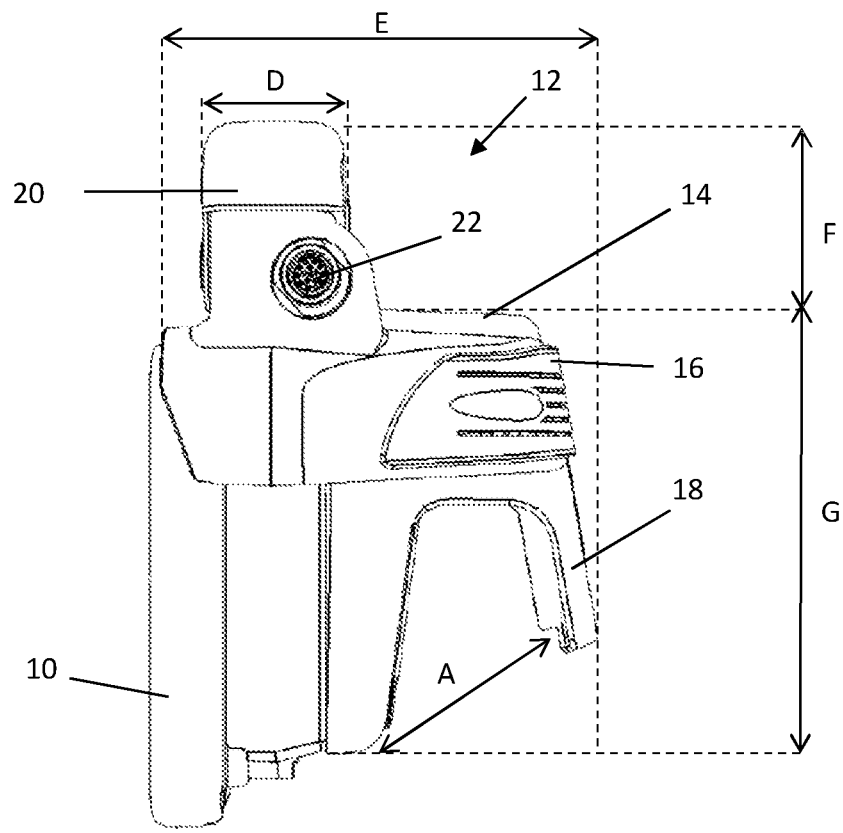
FIG. 4 shows a side view of the tablet device shown in FIG. 1.
Figure 5:
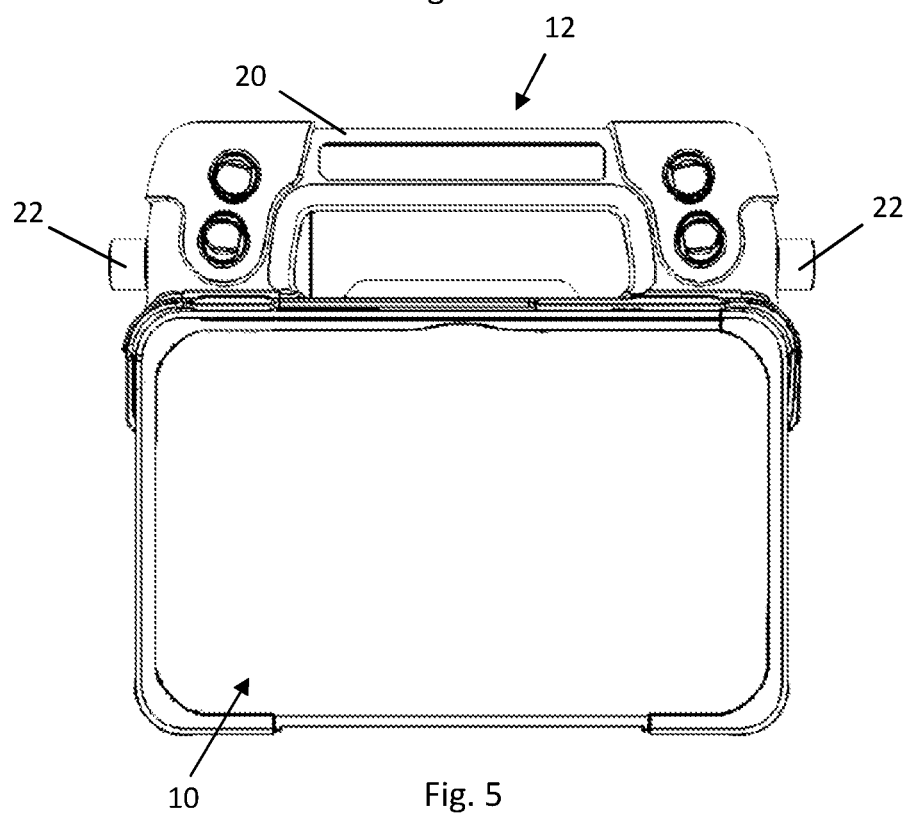
FIG. 5 shows a front view of the tablet device shown in FIG. 1.
Figure 6:
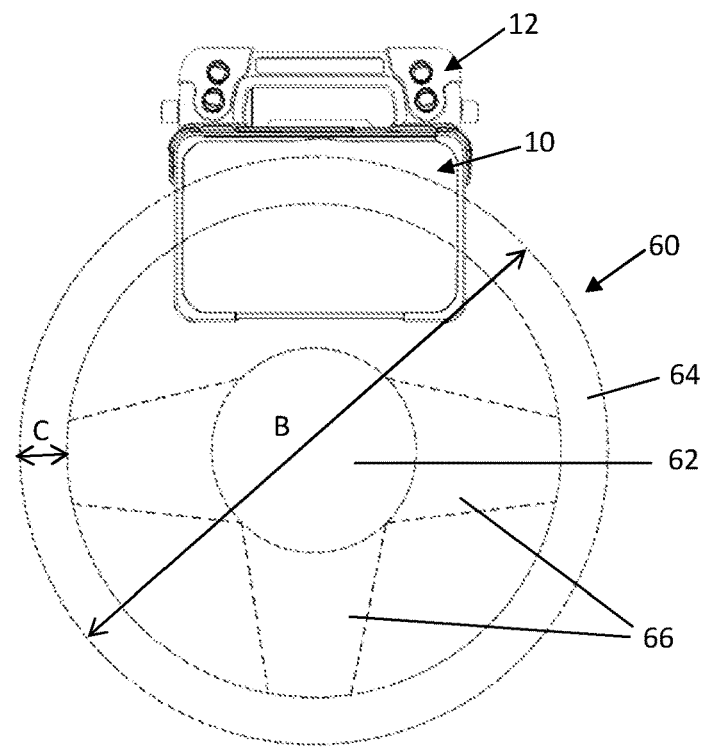
FIG. 6 shows a tablet device, cradle, and steering wheel according to a second embodiment of the invention.

FIGS. 1 to 5 show a tablet device 10 and a cradle 12 to which the tablet device 10 is removably connected. The removable connection may be via clips, or other conventional removable connection means, such as male and female connection portions mounted appropriately on the tablet device 10 and cradle 12. The tablet device 10 may be a Panasonic Toughpad PZ-M1 Windows tablet device. The tablet device 10 may comprise a number of features including a standard, DC power input, Bluetooth® connectivity, wireless connectivity and various other standard features of tablet devices. The main operator interface of the tablet device 10 is provided by a touchscreen. The cradle 12 comprises a removable top cover 14, which may cover a body portion 16. The body portion 16 may comprise a number of inputs and outputs connected to the tablet device 10, including a near field communication card reader. The body portion 16 may comprise a fan for cooling the tablet device 10. The fan may be powered by a battery located in the battery holding portion 15 of the body portion 16, or by an external power source connected to the body portion 16. The body portion 16 may comprise a temperature sensor arranged to detect the temperature of the tablet device 10, and further arranged to control the operation of the fan in dependence on the temperature of the tablet device 10. The body portion 16 is connected to a hooked portion 18, which is configured to be able to receive the top circumferential portion of a steering wheel (as shown in FIG. 6). The hooked portion 18 includes four additional connection points 19, which may be used to attach additional features to the hooked portion 18, for example clips or straps as required. The hooked portion 18 may be wider at the entrance to the hooked portion than at the top of the hooked portion. This may allow the hooked portion 18 to be engaged with steering wheel rims of a number of different sizes, and/or may improve the ease with which the hooked portion 18 is engaged with a steering wheel rim. The body portion is also connected to a handle portion 20 located above the hooked portion 18, which is shaped to allow an operator to lift, hold, and move the cradle 12 and tablet device 10 using the handle 20. Charging connections, such as DC power connectors 22, are located to each side of the handle portion 20 as shown in FIG. 3 to allow various charging apparatus to charge the tablet device. Four buttons 24 are also located on the handle portion 20, which may be used to provide an input to the tablet device 10. The hooked portion 18 is located relative to the tablet device 10 such that it may provide a support to the tablet device 10 when the tablet device 10 is placed on an approximately flat, horizontal surface. In alternative embodiments of the invention, the hooked portion may include a lipped bottom to improve the stability of the tablet device 10 and cradle 12 when placed on an approximately flat, horizontal surface.

FIG. 6 shows the tablet device 10 and cradle 12 engaged with a steering wheel 60. The steering wheel 60 comprises a central portion 62 housing an airbag, a steering wheel rim 64, and a number of spokes 66 extending from the central portion 62 to the steering wheel rim 64. In particular, the hooked portion 18 of the cradle 12 is located over the top portion of the steering wheel rim 64. As can be seen in FIG. 6, there is open space between the central portion 62 and the steering wheel rim 64, particularly in the top half of the steering wheel 60.

The steering wheel 60 may be approximately circular, with a diameter, indicated by the dimension B, between 300 mm to 450 mm, or between 350 mm and 400 mm. The steering wheel rim 64 may be approximately tubular in cross-section, with a cross-sectional width, indicated by the dimension C, of between 20 mm and 50 mm, or between 25 mm and 45 mm. Various dimensions are indicated on FIG. 4, noted by the arrows A, D, E, F, G. Examples of the values of these dimensions are:

A=55 mm
D=45 mm
E=115 mm
F=50 mm
G=130 mm

These example dimensions allow the tablet device 10 and cradle 12 to be mounted on a steering wheel in a position where anyone working on the vehicle, particularly in the driver's seat of the vehicle, is protected if a steering wheel airbag is accidentally deployed. Further details on the interaction of the airbag with the tablet device 10 and the cradle 12 is provided below.

Figure 7:
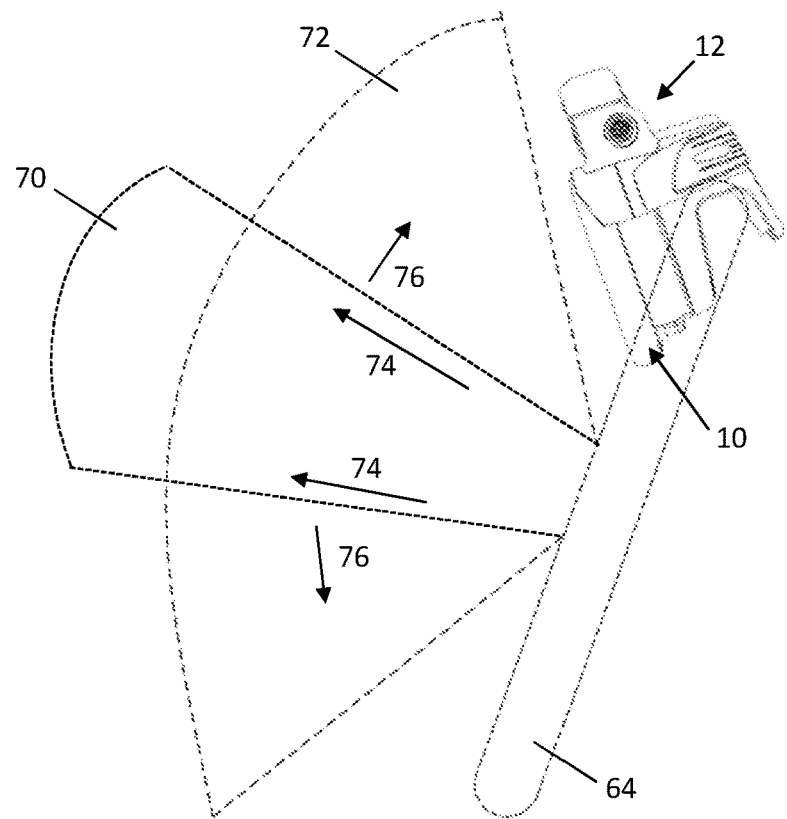
FIG. 7 shows a side view of the tablet device, cradle, and steering wheel as shown in FIG. 6.

FIG. 7 shows a side view of the steering wheel 60 to which the tablet device 10 and the cradle 12 have been attached. When an airbag is deployed, typically an explosive charge is triggered which causes a large amount of gas to be produced, which fills a bag which extends from the centre portion 62 of a steering wheel 60. During the initial deployment of the airbag, the airbag extends into a first deployment zone 70. As the airbag fills with gas and stabilises into a fully deployed position it moves into a second deployment zone 72. The arrows 74 indicate the direction of movement of the bag into the first deployment zone 70 and the arrows 76 show the subsequent movement of the bag into the second deployment zone 72.

As can be seen in FIG. 7, the tablet device 10 and cradle 12 are located on the steering wheel 60 such that the first deployment zone is not covered. However, as the airbag moves into the second deployment zone 72, the airbag pushes the bottom edge of the tablet device 10 and cradle 12 such that the tablet device 10 and cradle 12 pivot around the steering wheel rim 64. Therefore, rather than the airbag deployment causing the tablet device 10 and cradle 12 to move towards an operator in the car, the tablet device 10 and cradle 12 is pushed into the open space in the wheel 60, towards the instrument cluster in a typical car.

As will be appreciated by the skilled person, mounting the tablet device 10 and cradle 12 as shown in FIG. 7 provides a tablet device 10 which may be easily operated by an operator working on a vehicle, but also provides a safe mounting position because in the event of an airbag deployment, the tablet device 10 and cradle 12 is pushed away from an operator, towards the instrument cluster of a vehicle.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The hooked portion 18 may be provided with a removable insert. The removable insert may be removable or replaceable to adapt the cradle for mounting to a variety of differently sized and/or shaped steering wheels, and/or to allow the position of the tablet device to be adjusted in dependence on the deployment characteristics of a steering wheel airbag. The cradle may comprise one or more colour coded elements to identify which steering wheels the tablet device and cradle are compatible with. The cradle may comprise a plurality of connection options for connecting the tablet device to different power supplies. The cradle may comprise a configuration port, the configuration port adaptable to various different connection modules, such as bar-code readers, near field communication card readers, RFID transmitters, finger print readers, imaging devices, desktop docking stations, rugged connectors including USB and power, and wireless charging devices. Such connections may be made without requiring the tablet device 10 to be removed from the cradle 12. The cradle 12 may be configured for removable engagement with more than one type of tablet device. Such an arrangement may increase the adaptability and versatility of the cradle 12.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A tablet device and cradle holding the tablet device, wherein the cradle comprises a mounting portion for mounting the tablet device and the cradle to a steering wheel, the mounting portion configured such that when the tablet device and the cradle are mounted to a steering wheel, a bottom edge of the tablet device and the cradle lies outside a first airbag-deployment-zone and within a second airbag-deployment-zone, such that contact between the bottom edge of the tablet device and the cradle and an airbag deployed into the second airbag-deployment-zone pushes the tablet device and the cradle into the steering wheel.

2. The tablet device and the cradle as claimed in claim 1, wherein the cradle comprises an active cooling system for cooling the tablet device.

3. The tablet device and the cradle as claimed in claim 2, wherein the active cooling system comprises a powered fan.

4. The tablet device and the cradle as claimed in claim 3, wherein the cradle comprises a replaceable and/or rechargeable battery for running a powered fan.

5. The tablet device and the cradle as claimed in claim 4, wherein the cradle comprises a removable portion configured to allow access to a battery holding portion of the tablet device.

6. The tablet device and the cradle as claimed in claim 1, wherein the cradle comprises multiple charging connections configured to allow various different charging apparatus to charge the tablet device.

7. The tablet device and the cradle as claimed in claim 1, wherein the cradle comprises various connection points to allow additional components to be connected to and interact with the tablet device.

8. The tablet device and the cradle as claimed in claim 1, wherein the cradle comprises a replaceable insert.

9. The tablet device and the cradle as claimed in claim 8, wherein the replaceable insert is associated with a connection portion of the cradle.

10. A method of mounting a tablet device and a cradle to a steering wheel, the tablet device and the cradle as claimed in claim 1, comprising the steps of: mounting the tablet device and associated cradle to the steering wheel such that a bottom edge of the tablet device and the cradle is located outside a first airbag-deployment zone and inside a second airbag-deployment zone.

* * * * *